United States Patent [19]

Fischle et al.

[11] Patent Number: 5,454,443

[45] Date of Patent: Oct. 3, 1995

[54] MOTOR VEHICLE

[75] Inventors: Ruediger Fischle, Weissach; Rainer Joest, Muehlacker; Julius Tueri, Leutenbach; Rolf von Sivers, Rutesheim, all of Germany

[73] Assignee: Porsche AG, Weissach, Germany

[21] Appl. No.: 212,892

[22] Filed: Mar. 14, 1994

[30] Foreign Application Priority Data

Mar. 13, 1993 [DE] Germany .................. 43 07 999.7

[51] Int. Cl.⁶ .................. B60K 5/12; F16F 15/02
[52] U.S. Cl. .................. 180/312; 180/291
[58] Field of Search .................. 180/299, 300, 180/312, 291; 267/140.11, 141, 292; 248/562, 636, 638, 544

[56] References Cited

U.S. PATENT DOCUMENTS

| 1,876,812 | 9/1932 | Wiley et al. .................. 267/292 X |
| 3,018,990 | 1/1962 | Mueller . |
| 4,889,207 | 12/1989 | Von Broock .................. 180/312 X |
| 5,074,374 | 12/1991 | Ohtake et al. .................. 180/312 |

FOREIGN PATENT DOCUMENTS

| 1254890 | 1/1961 | France .................. 180/312 |
| 873936 | 4/1953 | Germany . |
| 919929 | 11/1954 | Germany . |
| 3940541A1 | 6/1990 | Germany . |
| 4111613A1 | 10/1992 | Germany . |
| 2022037 | 12/1979 | United Kingdom . |

*Primary Examiner*—Robert J. Oberleitner
*Assistant Examiner*—Peter M. Poon
*Attorney, Agent, or Firm*—Evenson McKeown Edwards & Lenahan

[57] ABSTRACT

For avoiding torsional vibrations of the vehicle body, the motor vehicle of the present invention uses a drive assembly as an absorber which is held via three bearings in the vehicle body. The bearings having a characteristic which determines a high natural frequency of the assembly roll mode and is modulated precisely to the vehicle body torsion and has a low vertical bearing stiffness.

10 Claims, 4 Drawing Sheets

MOTOR VEHICLE

BACKGROUND AND SUMMARY OF THE INVENTION

The invention relates motor vehicle comprising a motor vehicle body subject to torsional and bending vibrations, particularly a convertible body on which, via elastic bearings, a drive assembly is suspended which acts as an absorber mass, the drive assembly being held by three elastic bearings between side and cross members of the vehicle body.

A typical vehicle comprise of a plurality of vibrating systems. One of the systems is the motor vehicle body itself. This motor vehicle body interacts with other vehicle components, such as the chassis or the elastically disposed assembly, and these components influence one another. For example, the low frequency translational and rotational motor vehicle body vibrations are influenced by the modulation of the chassis. The shock absorbers dampen disturbing lifting and rolling motions.

However, the bending and torsional vibrations of the vehicle body are almost undamped. In the driving operation, they are excited by uneven road conditions and are transmitted in the form of vibrations by way of the seat, the back rest, and the steering system to the driver. In the case of convertibles the visually discernable shaking is also annoying.

Depending on the vehicle design, the vehicle modes have different amplitudes and resonances. As a function of the interaction with other vibration systems and the road excitations, these amplitudes and resonances are of importance particularly in the case of convertibles. They contribute to the comfort of the vehicle and to the impression of quality of the vehicle and are therefore becoming more and more important. Because of the open structural shell without the reinforcing effect of a firm roof, convertibles usually have a lower body stiffness than coupé vehicles.

The shaking of the vehicle body which occurs particularly on bad roads is significantly determined by the amplitudes and resonance frequency of the bending and torsional vibrations of the first degree of the vehicle body. Not only the body vibrations of the first degree, which are so important with respect to convertibles, are in the frequency range of approximately 11 to 24 Hz. Also, the natural resonances of the unsprung vehicle masses as well as the rigid body modes of the drive assembly which is elastically disposed in its rubber elements are in this frequency range.

Tests on road surfaces and of the resulting vehicle excitation have shown that, as the wavelength of the unevenness becomes smaller, the spectral density of the unevenness will decrease. This means that, while the driving speed is the same, lower frequency vehicle body modes are excited to a greater degree in the case of convertibles than the higher frequency body modes in the case of coupés.

In convertibles, an interaction of different vibration systems will necessarily result in increased vibration amplitudes in the vehicle body modes. While in the case of a coupe the torsion of the vehicle body is not excited or is excited only insignificantly during road travel, it is usually of great importance in the case of convertibles.

In many cases, a convertible is derived from a vehicle body of a coupé, so that basic structural changes are rarely possible. Reinforcing measures on the shell can often be carried out only to a limited degree because of many different marginal conditions.

Apart from the resulting high tool costs, a considerable increase in weight and packaging problems, the expected demands are met only with difficulty or only partially.

For this reason, secondary measures are increasingly used, such as vehicle body vibration absorbers. These absorbers reduce the maximum amplitude of the vehicle body torsional vibration and, depending on the number and weight of the used masses, have had considerable success while the modulation was optimal. Their effect, however, is usually of a narrow-band type so that an exact frequency modulation is required.

Variations in series, material fatigue and temperature influences may result in a considerable reduction of efficiency. In addition, the weight may also be increased considerably depending on the number and design of the absorber masses.

In order to achieve an absorption of torsional vibrations of the vehicle body, according to German Patent Document DE-41 11 613 A1, the drive subassembly is used as an absorber mass. The drive subassembly is disposed via elastic bearings in the vehicle body in such a manner that torsional vibrations of the vehicle body are converted to longitudinal vibrations of the drive unit, for the purpose of which mutually sloped elastic bearings are provided.

It is an object of the invention to largely reduce the motor vehicle body vibrations by means of a drive assembly which acts as an absorber.

This and other objects are achieved by the present invention which provides a motor vehicle comprising a vehicle body subject to torsional and bending vibrations and having side and cross members, a drive assembly suspended via elastic bearings to act as an absorber mass, the drive assembly being held by three elastic bearings between the side and cross members of the vehicle body. The three elastic bearings include one engine bearing which, with respect to the driving direction, is situated in front, and is arranged in a low vibration range in the drive assembly roll axis. Two rearward transmission bearings with a large base are held by rigid vehicle body elements which hold the rearward transmission bearings in a transverse plane and outside the roll axis in an area with maximal torsional vibration amplitudes. The two transmission bearings have a characteristic which determines a high natural frequency of a drive assembly roll mode and is precisely modulated to vehicle body torsion and has a low vertical bearing stiffness such that the drive assembly as an absorber swings freely about the roll axis. The three elastic bearings are arranged in a diagonal plane that rises towards the rear of the vehicle, with respect to the driving direction, and is set at an angle. The bearings are positioned such that a main axis of inertia of the drive assembly is situated in the driving direction and an overall center of gravity is situated in the diagonal plane.

Some of the principal advantages achieved by means of the invention are that the mass of the drive assembly is held in a swivelling manner by the elastic bearings about a roll axis in the vehicle body, so that the vehicle body vibrations, such as the vehicle body torsional vibrations, are reduced to a significant extent. For this purpose, measures are required with respect to the bearing sites, the stiffness modulation, and the position of the assembly roll axis with respect to the overall center of gravity of the drive assembly.

Thus, particularly the drive assembly is aligned as a compact assembly and is suspended by two elastic bearing elements close to the two rearward vehicle body corners as well as an engine bearing arranged in the longitudinal center axis of the vehicle.

By means of the variation of the vertical stiffnesses of the two rear transmission bearings—with respect to the driving direction—the roll mode of the assembly about the longitudinal axis of the vehicle can be modulated to the vehicle body torsion. In particular, the engine bearing situated in the roll axis will be inoperative, while the two transmission bearings are arranged in high vibration ranges, in which case a base between these bearings which is as large as possible is extremely important. It is only in this manner that the bearing stiffnesses at the two transmission bearings which are required for the absorber modulation can be kept low.

The bearings are arranged in a diagonal plane in which the main axis of inertia of the assembly is also situated and which extends through the center of gravity of the assembly.

For achieving a reduction of the torsional vibrations in the vehicle body, the three bearings are constructed with different stiffnesses in order to improve the vertical comfort during road travel, to reduce the structure-borne noise transmitted via the bearings as well as for achieving a broad-band absorber effect. The bearings are therefore constructed to be stiffer in the vertical direction than in the longitudinal direction and have an approximately identical stiffness in the transverse and vertical directions.

The transmission bearings are held in transversely disposed consoles which each include of a spring leaf standing in a vertical plane. These leaves are stiff about the roll axis in the vertical load direction and are constructed to be conditionally deflectable in the longitudinal direction of the vehicle for the absorption of longitudinal movements. A fastening to the transmission housing takes place by way of screws which are supported in the console by means of partially enclosed sleeves.

The absorber affect of the drive assembly may be used for a rear engine as well as for a front engine, in which case the engine may be constructed as a transversely installed engine or as a longitudinally installed engine.

The bearings may be constructed as rubber bearings or as hydrobearings.

For using the drive assembly as an absorber mass for vehicle body vibrations, the dynamics of vertical stiffnesses of the two exterior transmission bearing elements are of decisive importance. When hydrobearings are used, the acoustic coupling system must be adapted to the special conditions. By the selection of a suitable uncoupling play, the dynamic bearing stiffness must be modulated in the relevant vibration path range.

A bearing damping which is modulated in a targeted manner results in a low vertical engine stuttering, improves the broad-band capacity and therefore the insensitivity to series variations. When the damping is excessive, however, the absorber affect is reduced because no assembly roll mode can develop. The maximal effect of an assembly modulated as an absorber will be achieved in the case of an optimal assembly bearing concept, of a suitable dynamic vehicle body stiffness and an assembly bearing which is modulated in detail. In the case of a disadvantageous bearing concept, the necessity of a sufficient structure worn noise insulation represents a limit.

In principle, the drive assembly will advantageously act as an absorber when the two transmission bearing sites have a maximally large base. They are situated on the outside on the side members of the motor vehicle body or on corresponding lateral body parts. This permits a high natural frequency of the assembly roll mode while the bearing stiffness is low so that an effective acoustic insulation of the bearings can also be achieved.

The position of the transmission bearings on the high-vibration vehicle body corners permits an effective absorption of the torsion mode.

The third bearing, the engine, is situated in the assembly roll axis. The absorbing forces are transmitted only by way of the transmission bearings, that is, at points with a high vehicle body sensitivity.

The sporty chassis modulation, extreme low cross-section tires, and the wide track width result in an increased excitation of the vehicle body torsion during road travel which is considerably reduced by the drive assembly acting as the absorber.

Other objects, advantages and novel features of the present invention will become apparent from the following detailed description of the invention when considered in conjunction with the accompanying drawings.

DETAILED DESCRIPTION OF THE DRAWINGS

Figure 1:
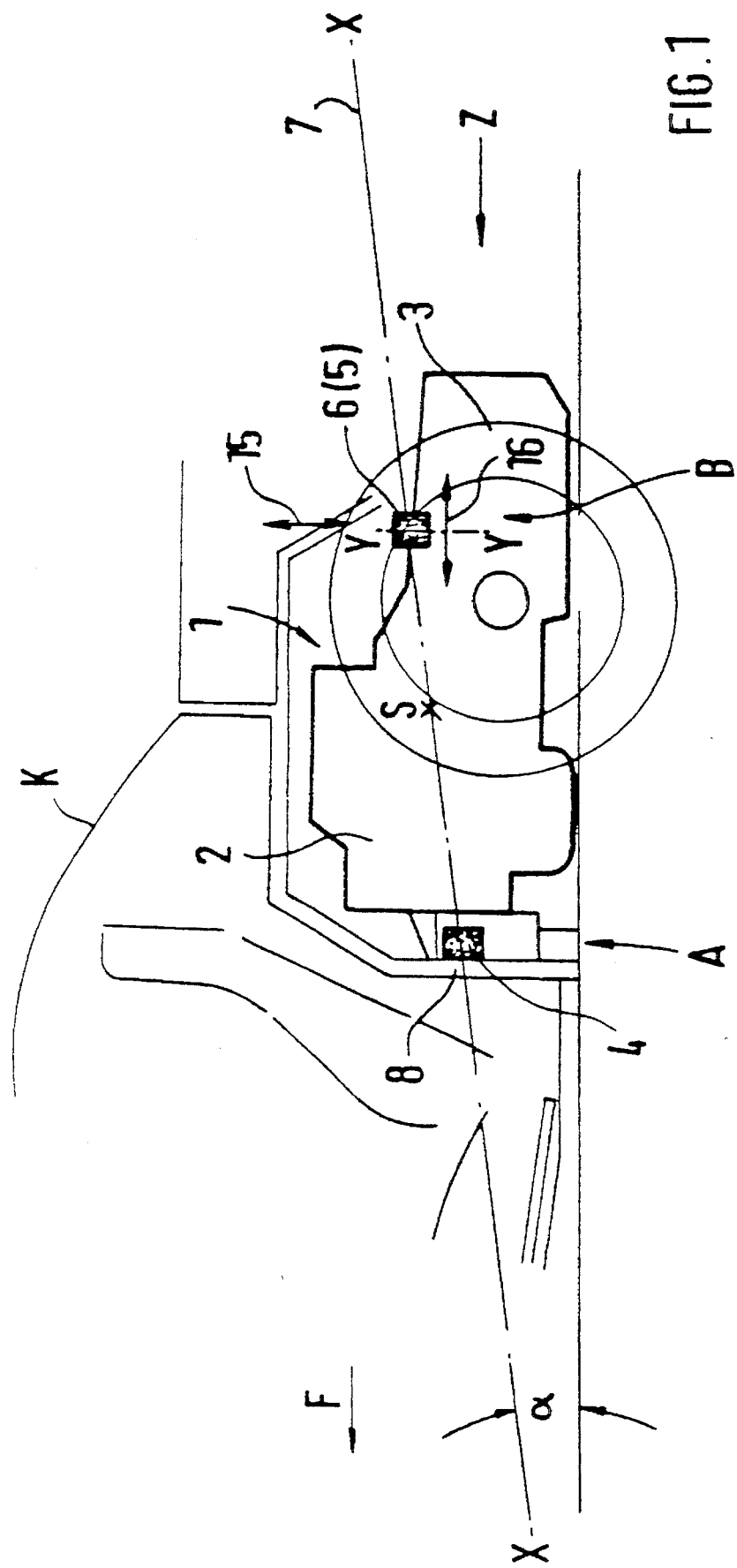
FIG. 1 is a lateral view of a motor vehicle comprising a drive assembly and bearings in accordance with an embodiment of the present invention.

FIG. 1 schematically illustrates a motor vehicle comprising a rear drive assembly 1, consisting of an engine 2 and a transmission 3. This assembly 1 is held by way of a, with respect to the driving direction F, forward engine bearing 4 and two rearward transmission bearings 5 and 6 in the vehicle body K.

Figure 2:
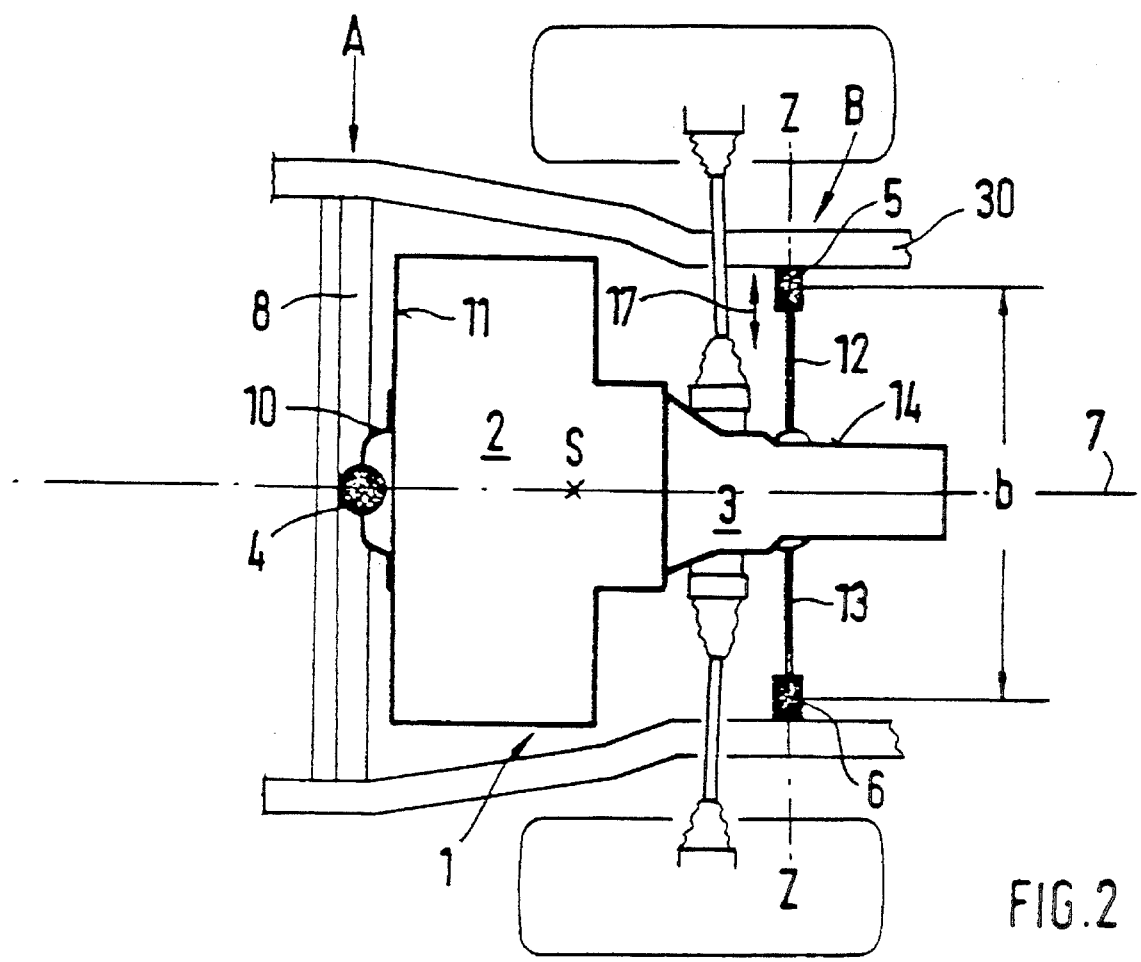
FIG. 2 is a top view of FIG. 1.

The engine bearing 4 is arranged in a low vibration area A in the rear drive assembly roll axis 7 and is supported on a cross member 8 of the vehicle body. By means of a traverse 10 (FIG. 2), the bearing 4 is connected with the engine casing 11.

Figure 3:
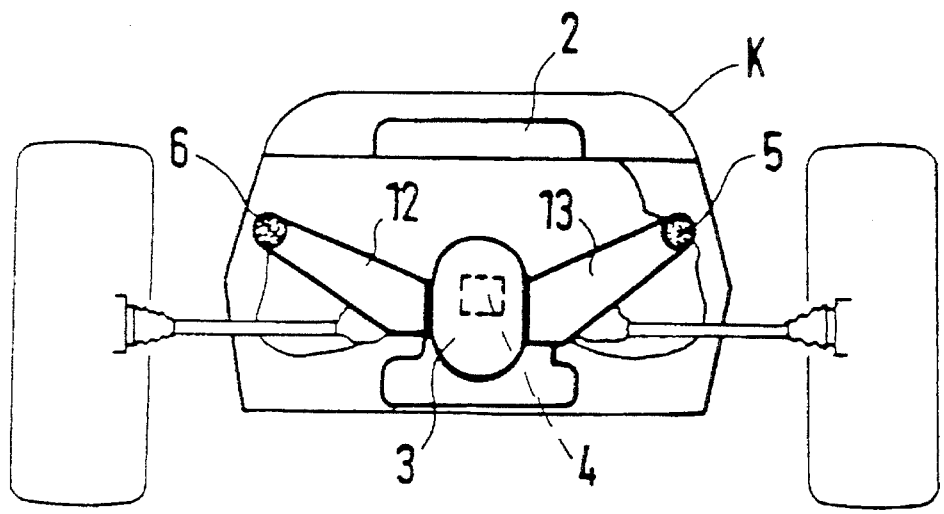
FIG. 3 is a view in the direction of the arrow Z of FIG. 1.

The transmission 3 is supported on the vehicle body K (FIG. 3) via the bearings 5 and 6 which are held on their ends by transversely extending consoles 12, 13 which are connected with the transmission housing 14. These bearings 5 and 6 are arranged in a high vibration range B which is arranged outside the roll axis 7 preferably in vehicle body corner areas in which there are maximal torsional vibration aptitudes.

The bearings 4, 5 and 6 are provided in a diagonal plane X—X set at an angle α, which diagonal plane X—X extends approximately through the overall center of gravity S of the drive assembly 1 and is situated in the assembly roll axis 7. In particular, the transmission bearings 5, 6 with a large base b (FIG. 2), (i.e. the bearings 5, 6 are situated as far apart as possible), are fastened to the vehicle body K because the torsional deflections are highest at this point and the absorption of the torsional vibrations of the vehicle body are therefore most effective at this point.

The transmission bearings 5, 6 are modulated with respect to the drive assembly or to the vehicle body in such a manner that they have a characteristic which determines a high natural frequency of the assembly roll mode and which is modulated precisely to the vehicle body torsion and has a low vertical bearing stiffness.

As a result, the drive assembly 1 can freely swing about its roll axis 7 in such a manner that it acts as an absorber, but at the same time a vertical comfort is achieved with respect to disturbance quantities coming from the road.

The vertical stiffnesses in the direction of arrow 15 of the transmission bearings 5, 6 are coordinated such that they are higher with respect to the longitudinal stiffnesses in the direction of arrow 16. The transverse stiffness in the direction of arrow 17 (FIG. 3) corresponds approximately to the vertical stiffness in the direction of arrow 15. The drive assembly 1, which is adapted in such a manner as an absorber, results in a considerable reduction of the vehicle body torsion by means of counter vibrations of the drive assembly 1, in which case the engine bearing 4 remains at rest.

By means of a special adaptation of the vertical stiffnesses of the two transmission bearings 5 and 6, the assembly roll mode about the vehicle longitudinal axis can be modulated more easily to the vehicle body torsion.

The bearings 4, 5 and 6 are supported on members of the vehicle body or on stiff body elements or on interposed structural elements. These supports have a stable and rigid construction.

The transmission bearings 5, 6 are connected with the transmission housing 14 via the transversely extending consoles 12, 13. In the illustrated exemplary embodiment, these consoles 12, 13 are constructed as leaf springs and are set in a perpendicular plane Y—Y so that they are stiff in the vertical direction, that is when the assembly is moved, about the roll axis 7 and can be conditionally bent in the longitudinal direction of the vehicle.

Figure 4:
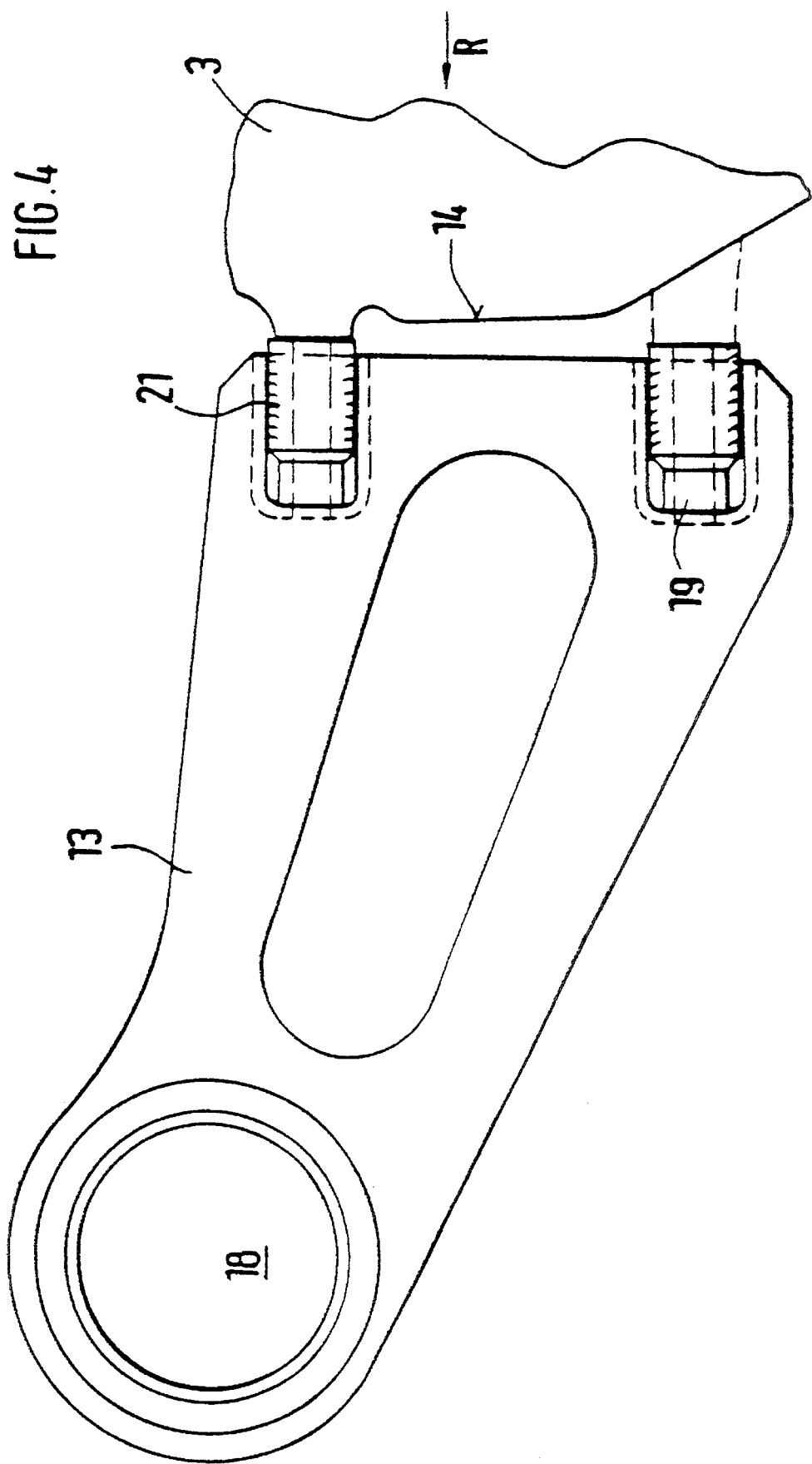
FIG. 4 is a view of a console for a transmission bearing in which, with respect to the driving direction, the left console is shown.
Figure 5:
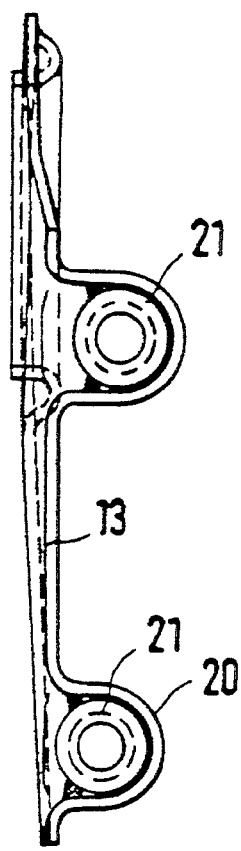
FIG. 5 is a view of the console in the direction of the arrow R of FIG. 4.
Figure 6:
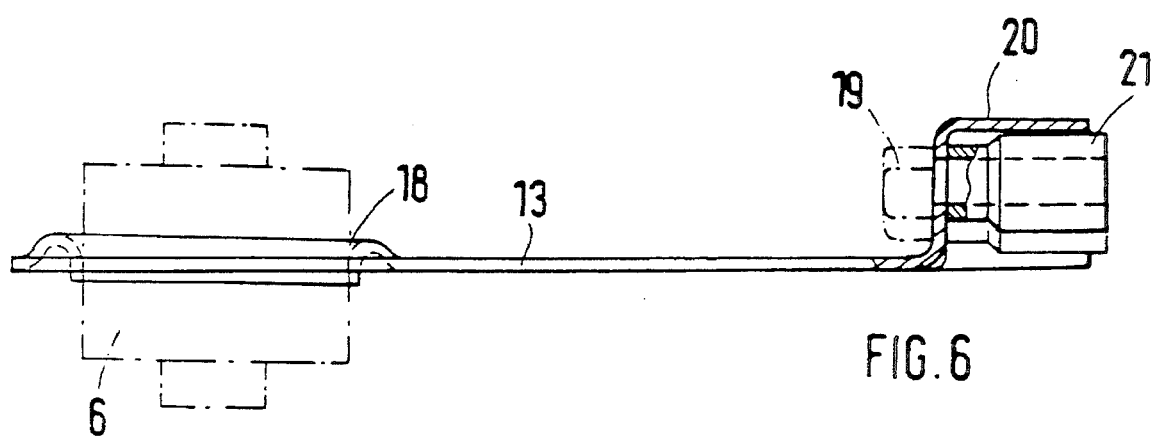
FIG. 6 is a top view of the console.

As illustrated in detail in FIGS. 4 to 6, the bearing 6 is housed in a receiving device 18 of the console 13. The fastening of the console 13 on the transmission housing 14 takes place via screws 19, for example. The screws 19 are supported on sleeves 21 which are partially surrounded by shaped-out portions 20 of the console and rest directly against the housing wall by means of a face. The sleeves 21 are fixably connected with the console 13.

A deformation of the assembly in the driving direction F as well as against the driving direction F is almost excluded as a result of the leaf spring 12, 13 which is soft in these directions. An additional tolerance compensation in the driving direction and against the driving direction in bearings 5 and 6 will not be necessary because the longitudinal forces are absorbed mainly by the engine bearing.

Although the invention has been described and illustrated in detail, it is to be clearly understood that the same is by way of illustration and example, and is not to be taken by way of limitation. The spirit and scope of the present invention are to be limited only by the terms of the appended claims.

What is claimed is:

1. A motor vehicle comprising a vehicle body subject to torsional and bending vibrations and having side and cross members, comprising:

a drive assembly suspended via elastic bearings to act as an absorber mass, the drive assembly being held by three elastic bearings between the side and cross members of the vehicle body;

wherein the three elastic bearings include one engine bearing which, with respect to the driving direction, is situated in front, and is arranged in a low vibration range in the drive assembly roll axis; and two rearward transmission bearings with a large base;

rigid vehicle body elements which hold the rearward transmission bearings in a transverse plane and outside the roll axis in an area with maximal torsional vibration amplitudes;

wherein the two transmission bearings have a characteristic which determines a high natural frequency of a drive assembly roll mode and is precisely modulated to vehicle body torsion and has a low vertical bearing stiffness such that the drive assembly as an absorber swings freely about the roll axis; and wherein the three elastic bearings are arranged in a diagonal plane that rises towards the rear of the vehicle, with respect to the driving direction, and is set at an angle ($\alpha$), wherein the bearings are positioned such that a main axis of inertia of the drive assembly is situated in the driving direction and an overall center of gravity is situated in the diagonal plane.

2. A motor vehicle according to claim 1, wherein the elastic bearings have a higher stiffness in the vertical direction arrow than in a longitudinal direction arrow and have an approximately identical stiffness in a transverse direction as in the vertical direction.

3. A motor vehicle according to claim 2, further comprising a transverse arm supported on the vehicle body and which holds the engine bearing, and transversely situated consoles connected with a transmission housing and in which the transmission bearings are respectively disposed.

4. A motor vehicle according to claim 3, wherein the consoles are vertically aligned spring leaves which are stiff in the vertical direction about the assembly roll axis and are conditionally deflectable in the longitudinal direction of the vehicle.

5. A motor vehicle according to claim 4, further comprising screws which are arranged in sleeves which on the console are partially surrounded by a shaped-out portion and are fastened in the shaped-out portion, the screws connecting the consoles, to the transmission housing.

6. A motor vehicle according to claim 3, further comprising screws which are arranged in sleeves which on the console are partially surrounded by a shaped-out portion and are fastened in the shaped-out portion, the screws connecting the consoles, to the transmission housing.

7. A motor vehicle according to claim 1, further comprising a transverse arm supported on the vehicle body and which holds the engine bearing, and transversely situated consoles connected with a transmission housing and in which the transmission bearings are respectively disposed.

8. A motor vehicle according to claim 7, wherein the consoles are vertically aligned spring leaves which are stiff in the vertical direction about the assembly roll axis and are conditionally deflectable in the longitudinal direction of the vehicle.

9. A motor vehicle according to claim 8, further comprising screws which are arranged in sleeves which on the console are partially surrounded by a shaped-out portion and are fastened in the shaped-out portion, the screws connecting the consoles, to the transmission housing.

10. A motor vehicle according to claim 7, further comprising screws which are arranged in sleeves which on the console are partially surrounded by a shaped-out portion and are fastened in the shaped-out portion, the screws connecting the consoles to the transmission housing.

* * * * *